United States Patent [19]

Feigenbaum et al.

[11] 4,450,212

[45] May 22, 1984

[54] EDGE SEAL FOR A POROUS GAS DISTRIBUTION PLATE OF A FUEL CELL

[75] Inventors: Haim Feigenbaum, Highland Park; Sheldon Pudick, Sayreville; Rajindar Singh, Ridgewood, all of N.J.

[73] Assignee: Engelhard Corporation, Iselin, N.J.

[21] Appl. No.: 430,142

[22] Filed: Sep. 30, 1982

[51] Int. Cl.³ .......................... H01M 4/88; H01M 8/02
[52] U.S. Cl. .......................................... 429/35; 429/36; 427/115
[58] Field of Search ................... 429/36, 35; 427/115

[56] References Cited

U.S. PATENT DOCUMENTS 4,259,389 3/1981 Vine et al. ............................. 429/36
4,374,906 2/1983 Breault et al. ........................ 429/36

Primary Examiner—Donald L. Walton

[57] ABSTRACT

In an improved seal for a gas distribution plate of a fuel cell, a groove is provided extending along an edge of the plate. A member of resinous material is arranged within the groove and a paste comprising an immobilized acid is arranged surrounding the member and substantially filling the groove. The seal, which is impervious to the gas being distributed, is resistant to deterioration by the electrolyte of the cell.

13 Claims, 7 Drawing Figures

EDGE SEAL FOR A POROUS GAS DISTRIBUTION PLATE OF A FUEL CELL

BACKGROUND OF THE INVENTION

The National Aeronautics and Space Administration of the United States Government has rights under this application pursuant to Contract No. DEN 3-241.

Reference is hereby made to other related patent applications which are assigned to the same assignee as the present application; Application of H. Feigenbaum and A. Kaufman entitled "Integral Gas Seal For A Fuel Cell Gas Distribution Plate", Ser. No. 430,453, Filed On Sept. 30, 1982 and Application of H. Feigenbaum and S. Pudick entitled "A Process For Forming Integral Edge Seals In porous Gas Distribution Plates Utilizing A Vibratory Means", Ser. No. 430,291, Filed On Sept. 30, 1982.

The present invention relates to improved elements for use in fuel cells, fuel cells employing such elements, and processes and apparatus for making the elements.

It has been known for some time that fuel cells can be extremely advantageous as power supplies, particularly for certain applications such as a primary source of power in remote areas. It is highly desirable that any such fuel cell assembly be extremely reliable. Various fuel cell systems have been devised in the past to accomplish these purposes. Illustrative of such prior art fuel cells are those shown and described in U.S. Pat. Nos. 3,709,736, 3,453,149 and 4,175,165. A detailed analysis of fuel cell technology comparing a number of different types of fuel cells appears in the "Energy Technology Handbook" by Douglas M. Consadine, published in 1977 by McGraw Hill Book Company at pages 4-59 to 4-73.

U.S. Pat. No. 3,709,736, assigned to the assignee of the present invention, describes a fuel cell system which includes a stacked configuration comprising alternating fuel cell laminates and electrically and thermally conductive impervious cell plates. The laminates include fuel and oxygen electrodes on either side of an electrolyte comprising an immobilized acid. U.S. Pat. No. 3,453,149, assigned to the assignee of this invention, is illustrative of such an immobilized acid eletrolyte. In U.S. Pat. No. 4,175,165, assigned to the assignee of the present invention, a stacked array of fuel cells is described wherein gas distribution plates include a plurality of gas flow channels or grooves with the grooves for the hydrogen gas distribution being arranged orthogonally relative to the grooves for the oxygen distribution. The gas distribution plates themselves, whether they are individual termination plates for one or the other of the gases or bi-polar plates for distributing both gases in accordance with this disclosure, are formed of an electrically conductive impervious material.

In more recent designs, the gas distribution plates, which are sometimes called A-plates, are formed of a porous material so that a more uniform and complete flow of gas over the electrode surface is provided. In previous systems where nonporous gas distribution plates were utilized, the reactants always flowed only through the grooves and were contained by the walls thereof. However, in the more recent systems utilizing porous plates, it has been necessary to assemble a sealing gasket along the edges of the plate before it was assembled into the cell to prevent the reactant gases from exiting through the plate edges and mixing together. If leakage did occur, the cells could operate improperly or fail altogether.

Accordingly, it is an aim of this invention to provide an improved seal for a gas distribution plate.

It is a further aim of this invention to provide an improved seal for a gas distribution plate of a fuel cell.

It is a yet further aim of this invention to provide a fuel cell including gas distribution plates as above.

SUMMARY OF THE INVENTION

Porous gas distribution plates for applications such as in fuel cells are provided with an improved seal such as along an edge thereof and, preferably, along opposed edges thereof. The porous gas distribution plate, such as that used in a bi-polar assembly, conventionally includes an impervious layer covering a face of the plate. The seal is arranged adjacent at least one edge of the plate and, preferably, opposed edges. The seal comprises a groove extending along the edge of the plate through its entire cross section to the impervious layer. A member of resinous material is arranged within the groove. A paste comprising an immobilized acid is arranged surrounding the member and substantially filling the groove.

Preferably, the resinous material comprises Teflon and the member comprises a cord means. Preferably, the paste comprises a silicon carbide filler in the form of small particles, a Teflon binder in the form of fibers mixed with concentrated phosphoric acid.

BRIEF DESCRIPTION OF THE DRAWINGS

The invention will now be described by reference to the following drawings and description in which like elements have been given common reference numbers.

DETAILED DESCRIPTION OF THE PREFERRED EMBODIMENT

Figure 1:
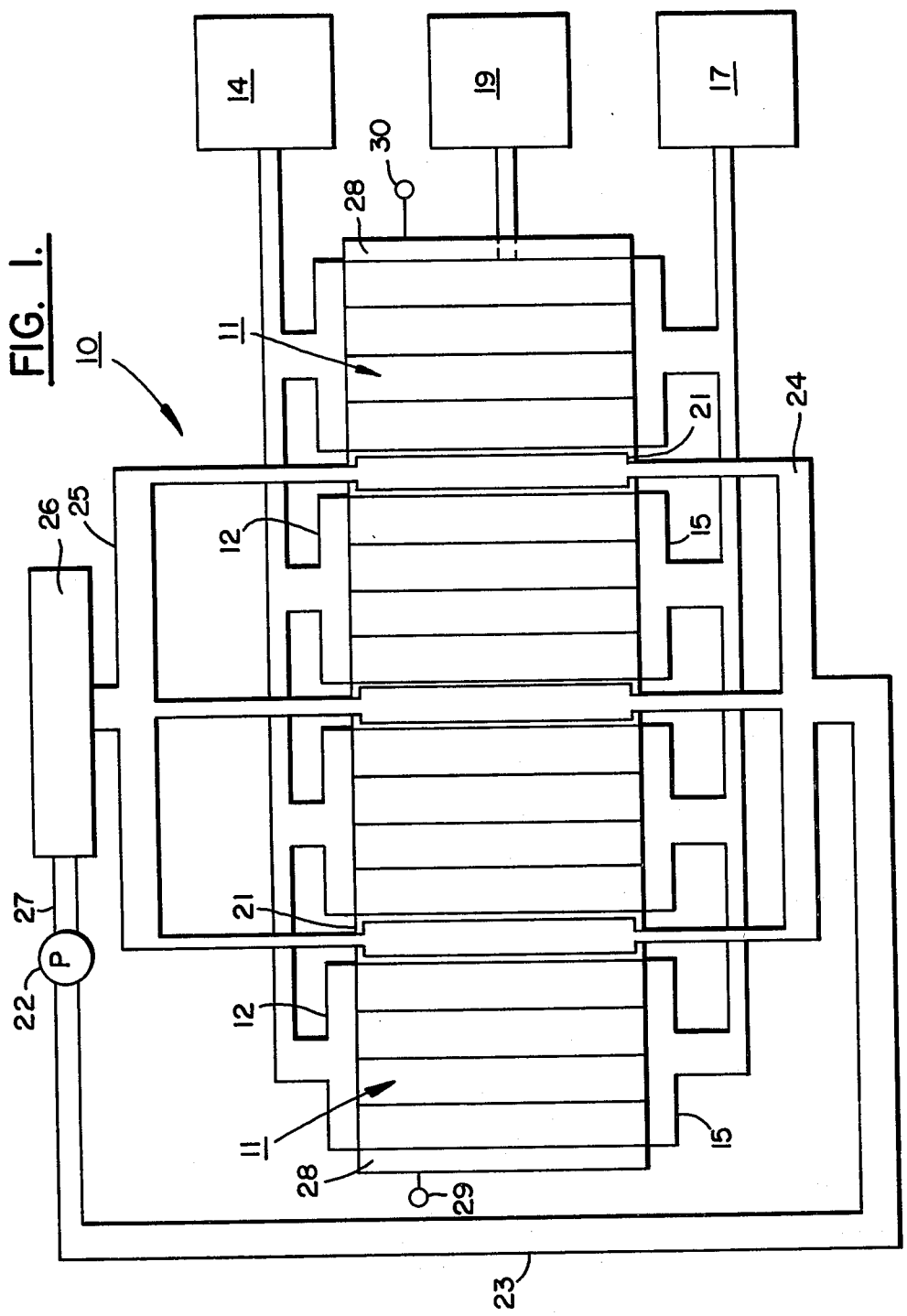
FIG. 1 is a schematic representation of a fuel cell assembly comprising a plurality of stacked fuel cells with intermediate cooling plates and terminal current collecting plates.

An exemplary fuel cell stack assembly 10 employing a plurality of fuel cells 11 in accordance with this invention is now described with reference to FIGS. 1 and 2. Hydrogen gas input manifolds 12 are arranged along one side of the stack assembly 10. While a plurality of manifolds 12 are shown for each group of fuel cells 11, if desired, a single manifold arrangement could be used. The manifolds 12 are connected to a source of hydrogen gas 14. Hydrogen gas collecting manifolds 15 are arranged along the opposing stack side in correspondence with the gas input manifolds 12. Here again, while a plurality of manifolds 15 are shown, a single manifold could be used if desired. The collecting manifolds 15 are, in turn, connected to a hydrogen gas discharging or recirculating system 17. The hydrogen gas from the input manifolds 12 flows through gas distribution plates 18 to the collecting manifolds 15.

In a similar fashion, a plurality of oxygen or air input manifolds (not shown) are arranged along the stack side (not shown) connecting the one stack side and the opposing stack side. These oxygen manifolds are connected to an oxygen source 19. The oxygen may be supplied in the form of air rather than pure oxygen if desired. In a similar fashion, a plurality of collecting manifolds are arranged along the stack side (not shown) opposing the stack side having the oxygen input manifolds and connecting the respective one stack side and opposing stack side. These manifolds would also be connected to an oxygen storage or recirculating system (not shown). The oxygen or air from the input manifolds (not shown) flows through the oxygen gas distribution plates 20 to the respective collecting manifolds (not shown).

In this embodiment, cooling plates 21 are arranged periodically between adjacent fuel cells 11. Three cooling plates 21 are shown arranged intermediate each four cell 11 array. The cooling fluid flowing through the cooling plates 21 is preferably a dielectric fluid, such as a high temperature oil such an oil manufactured by Monsanto under the trade name, Therminol. A pump 22 circulates the dielectric fluid via conduit 23 and input manifold 24 into the respective cooling plates 21. The dielectric fluid then flows into collecting manifold 25 which is connected to a heat exchanger 26 for reducing the temperature of the dielectric fluid to the desired input temperature. A conduit 27 then connects the heat exchanger back to the pump 22 so that the fluid can be recirculated through the respective cooling plates 21.

The fuel cells 11 and the cooling plates 21 are electrically conductive so that when they are stacked as shown, the fuel cells 11 are connected in series. In order to connect the stack assembly 10 to a desired electrical load, current connecting plates 28 are employed at the respective ends of the stack assembly 10. Positive terminal 29 and negative terminal 30 are connected to the current connecting plates 28 as shown and may be connected to the desired electrical load by any conventional means.

Each fuel cell 11 is made up of a plurality of elements and includes a hydrogen gas distribution plate 18 and an oxygen or air distribution plate 20. Arranged intermediate the respective gas distribution plates 18 and 20 are the following elements starting from the hydrogen gas distribution plate 18; anode 31, anode catalyst 32, electrolyte 33, cathode catalyst 34 and cathode 35. These elements 31–35 of the fuel cell 11 may be formed of any suitable material in accordance with conventional practice.

The hydrogen gas distribution plate 18 is arranged in contact with the anode 31. Typically, the anode comprises a carbon material having pores which allow the hydrogen fuel gas to pass through the anode to the anode catalyst 32. The anode 31 is preferably treated with Teflon (polytetrafluoroethylene) to prevent the electrolyte 33, which is preferably an immobilized acid, from flooding back into the area of the anode. If flooding were allowed to occur, the electrolyte would plug up the pores in the anode 31 and lessen the flow of hydrogen fuel through the cell 11. The anode catalyst 32 is preferably a platinum containing catalyst. The cell 11 is formed of an electrically conductive material, such as a carbon based material except for the immobilized acid electrolyte layer which does not conduct electrons but does conduct hydrogen ions. The various elements, 18, 31–35, and 20 are compressed together under a positive pressure. The electrolyte 33, such as phosphoric acid, is immobilized by being dispersed in a gel or paste matrix so that the acid is not a free liquid. An exemplary electrolyte matrix could comprise a mixture of phosphoric acid, silicon carbide particles and Teflon particles.

The cathode catalyst 34 and the cathode 35 are formed of the same types of materials as the respective anode catalyst 32 and anode 31. Therefore, the anode 31 and the cathode 35 comprise porous carbon and the anode catalyst 32 and cathode catalyst 34 can comprise a platinum containing catalyst. The cathode 35 can also be treated with Teflon to prevent the electrolyte from flooding back into the porous carbon comprising the cathode.

Figure 2:
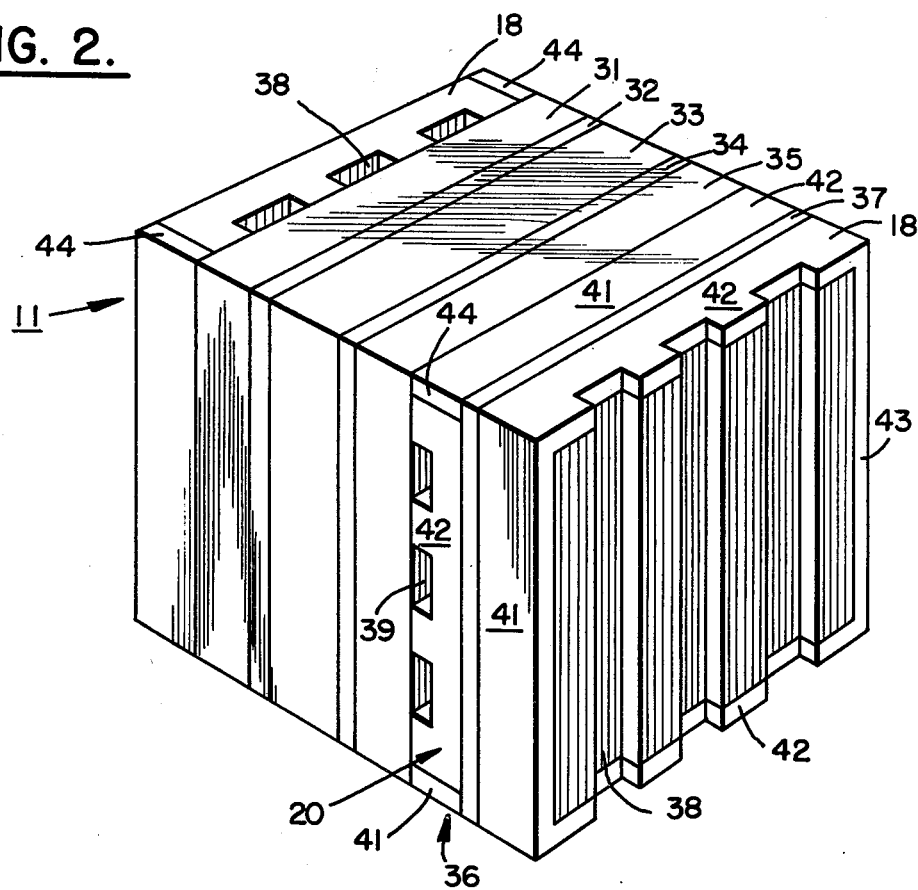
FIG. 2 is a perspective view of a portion of the fuel cell assembly of FIG. 1 illustrating an individual fuel cell in greater detail.

All of the elements of the cell 11 are arranged in intimate contact as shown in FIG. 2. In order to provide an electrically interconnected stack assembly 10, bi-polar assembly 36 is used to connect together adjacent fuel cells 11. A bi-polar assembly 36 is comprised of a hydrogen gas distribution plate 18 and an oxygen or air distribution plate 20 with an impervious interface layer or plate 37 arranged between them. Therefore, a bi-polar assembly 36 is comprised of the hydrogen gas distribution plate 18 of one cell 11 and the oxygen or air gas distribution plate 20 of the next adjacent cell 11. The interface layer or plate 37 may comprise an impervious carbon plate or any other conventional interface as may be desired. In the bi-polar assembly 36, the respective plates 18 and 20, having the interface 37 therebetween, are securely connected together as a unit so as to have good electrical conductivity.

In order to facilitate the gas flow in the gas distribution plates 18 and 20, respective channels or grooves 38 or 39 are employed. The grooves 38 in the hydrogen gas distribution plate 18 are arranged orthogonally or perpendicularly to the grooves 39 in the oxygen or air gas distribution plate 20. This allows the grooves to be easily connected to respective input and output manifolds 12 and 15, for example, on opposing sides of the cell stack assembly 10. Although grooves within a particular plate, such as plates 18 or 20, are shown as extending in a unidirectional manner in FIG. 2, there can be cross-channels made between these grooves to aid in the distribution of the fluidic reactants. When such cross-channels are utilized, the primary flow of reactants is still in the direction of the grooves 38 and 39 shown in FIG. 2; that is, in the direction that the reactants flow between the reactants input and collecting manifolds.

The gas distribution plates 18 and 20 supply the respective hydrogen and oxygen or air gases to the surfaces of their respective anode 31 or cathode 35. In order to more evenly distribute the respective gases at the anode 31 or cathode 35 plate surfaces, the gas distribution plates 18 and 20 are preferably formed of a porous carbon material. This allows the respective gases to flow through the pores of the plates 18 and 20 between the respective channels 38 or 39 to provide more uniform gas distribution over the face of the respective anode 31 or cathode 35.

In accordance with an embodiment of the invention, it is desired to prevent the reactant gas from flowing out of the edges 41 which lie in a direction parallel to the gas flow direction between respective entry and exit manifolds; e.g., parallel to the channels 38 or 39. In prior configurations, the edges 41, as well as the edges 42 lying generally orthogonal thereto, were sealed by means of a gasket so that the reactant flow was distributed across the whole frontal surface of the anode 31 or cathode 35 and was not allowed to drain out other than to a collecting manifold. The gasket approach, however, was not as practical a seal as desired.

There are several possible methods of manufacture of the plate assemblies. For instance, a first method can comprise of a plate 18, as depicted in FIG. 2, having seals 44 placed on two opposed edges thereof by the process described herein, the edges being the ones parallel to the grooves 38. These plates can be used directly in cooling plate and current collecting plate assemblies. A second method is useful in the case where a bi-polar plate assembly is made. The two gas distribution plates 18 and 20 can be first assembled together with an impervious plate 37 and then all four sides of the assembly sealed, seal 43, via the process. After sealing, the grooves 38 and 39 can be placed in the gas distribution plates 18 and 20, respectively, to enable the reactants to be brought into the assembly. Alternatively, a third method of making sealed plates 18, as described above, can be employed in constructing a bi-polar plate assembly. Two plates 18 having seals 44 can be assembled together with an impervious layer therebetween so that the grooves in each plate are orthogonal to each other after assembly. In this case no further edge sealing is required since the seals already exist on the plates.

Method three can be employed when porous gas distribution plates are without grooves as long as the edge seals of the two plates are assembled orthogonal to each other.

Figure 3:
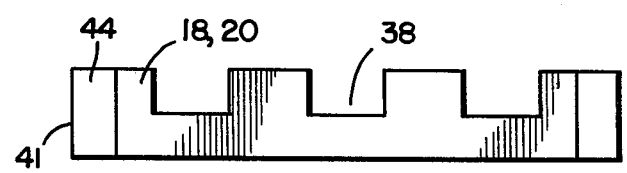
FIG. 3 is a cross-sectional view of a gas distribution plate using seals in accordance with an embodiment of this invention.
Figure 4:
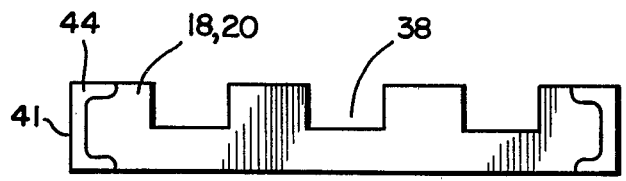
FIG. 4 is a cross-sectional view of a porous gas distribution plate having another embodiment of formed edge seals.

Referring now to FIGS. 2-5, the method for manufacturing the integral edge seal 43 or 44 is described. In FIGS. 3 and 4, a cross-section of a gas distribution plate 18 is shown. Similarly, an integral edge seal 44 is shown. FIG. 4 shows an alternate seal with a different depth of penetration compared to that in FIG. 3. In order to form the desired integral edge seal in a gas distribution plate comprising a porous carbon plate, the porous structure of the gas distribution plate is impregnated at the edges with a suitable adhesive such as a graphite adhesive. The pores in the seal layers 43 or 44 are filled by dipping the plate edges 41, parallel to the grooves, or 42, orthogonal to the grooves, in a bath 45 comprising a graphite adhesive solvent mixture. The bath 45 is supported in any suitable vessel or container 46. While a graphite cement solvent mixture is preferred for the bath 45, other suitable materials include all types of powders that are non-corroding in hot phosphoric acid; for example acid in the approximately 200° C. range. Tungsten carbide powder suspended or dispersed in a suitable carbonizable material such as polyvinyl alcohol is an example of an alternative material.

A suitable graphite adhesive or cement may be obtained from Cotronics Corporation, New York, N.Y. under the trade designation "931 Graphite Adhesive". The bath 45 is preferably comprised of from about 50 to 150 grams by weight of graphite adhesive and approximately 35-95 cc. by volume of solvent. The solvent may comprise any suitable carbonizable material. A particularly preferred bath composition comprised of Cotronics graphite adhesive in the ratio of 100 grams to 70 cc. of the solvent. An alternative graphite cement suitable for this purpose is Union Carbides "C-34". The graphite cement is non-corroding when exposed to the phosphoric acid electrolyte 33. To form the seal 43 or 44, a respective end of the plate having an edge 41, or optionally 42, is immersed in the bath 45 by a dipping procedure. The graphite cement plugs up the pores in the seal layers 43 or 44. The process is then repeated for each of other edges 41 or 42 desired to be sealed. Any excess material remaining on the plate 18 or 20, after removal from the bath 45, is, in turn, removed by means of a blade or other suitable device.

The seal 43 or 44 is then cured by heating the plate at an elevated temperature for a desired time interval or at a plurality of temperatures for different time intervals. A suitable curing process comprises heating the plate to an elevated temperature of from about 50° C. to about 400° C. from a time of from about 4 hours to about 50 hours or longer. In a particularly preferred approach, the plate 18 or 20 is heated in three stages at respectively increasing temperatures. In a first stage, it is heated for about 2 to 8 hours at a temperature from about 50° C. to 150° C. In the second stage, it is heated for about 8 to 24 hours at a temperature of from about 80° C. to about 200° C. In the third stage, it is heated for from about 8 to 24 hours at a temperature of from about 150° C. to about 400° c.

As an example of the above process, a plate 18 or 20 impregnated in a bath having graphite adhesive in the ratio of about 100 grams to about 77 cc. of solvent was heated for four hours at 100° C., followed by heating for 16 hours at 130° C., followed by heating for 16 hours at a temperature of about 200° C. The resulting seal 43 or 44, after being dried or cured as described, can tolerate a pressure difference of at least 20 inches of water without leaking. The seal 43 or 44 performs well dry or wetted with phosphoric acid. It is preferred to wet the seal with electrolyte. Electrolyte is held by the seal layer through capillary forces. The term "Seal Layer" as used herein includes a layer, zone, region, area or volume which contains sealing material. The seal can be prepared prior to fuel cell stack 10 assembly, hence decreasing significantly the time needed for assembly. The preparation procedure for the seal 43 or 44 can be easily mechanized to reduce its cost.

The procedure thus described has a particular application for gas distribution plates 18 or 20 formed with large pores, for example, plates formed with reticulated vitreous carbon (RVC). Such large pore carbon plates 18 or 20 typically have pores in the approximately 0.1 to 1.0 mm size range. Seals 43 and 44 can be formed in such plates by the simple dipping process described above so that the seal layer extends uniformly, as shown in FIG. 3, throughout the cross-section of the plate 18 or 20.

There is a trend today from the utilization of large pore gas distribution plates to smaller pore carbon plates. For example, plates having pores in the approximately 0.01 to 0.10 mm size range are being used for such cell elements. Although the seals made in the manner described above are normally adequate for many uses, an improvement in the seal can be made by providing a vibratory treatment of the solution during the impregnation step. This improvement is particularly useful when working with plates 18 or 20 such as those made of a needled felt material, for example a rayon felt purchased from Fiber Material, Incorporated of Biddeford, Maine. The felt is a partially carbonized product which is then completely carbonized by Pfizer Corporation of New York, N.Y. to provide a completely carbonized needled felt small pore plate 18 or 20.

Although sealing would occur as shown in FIG. 4, there is some degree of risk in the long term use of the seal particularly in small pore plates. Because of the small pores in the plate, the seal might deteriorate since a complete layer 43 or 44 is not formed throughout the thickness of the plate 18 or 20. In order to overcome this problem, a vibratory means or assist is provided in any suitable manner such as a transducer 47 connected to vessel 46. Many devices for providing vibrations are known such as ultrasonic, magnetic, etc., and these can be used for this application. The frequency of vibrations should be at least about 50 cycles/second and can be in the range of about 50 to 500,000 cycles/second. Preferably, frequencies of about 20,000 to 100,000 cycles/second are used when ultrasonic vibrator means is used, and, most preferably, frequencies of about 20,000–60,000 cycles/second. Energization of the vibratory means causes the bath 45 to be agitated. This, in turn, drives the sealing material into the ends of the plates 18 or 20 to provide a seal extending uniformly through the thickness of the plate as depicted in FIG. 3.

The impregnation process using vibratory means is carried out at room temperature with essentially the same bath composition as described previously. After the plate 18 or 20 is immersed or dipped in the bath 45, the vibratory means is energized for periods ranging from about 30 to 180 seconds. Thereafter, excess material is removed, as in the previous process, without vibratory means and the seal 43 or 44 is dried or cured as previously described. It has been found that when this process is carried out with the vibratory agitation of the bath 45 for a small pore plate 18 or 20, improved penetration of the impregnating sealing material is achieved reducing the possibility of pin hole leaks. In this exemplary embodiment a small pore plate was impregnated with vibratory assist and no leaks were observed when pressure tested up to at least 10 inches of water. This is compared to failure at 4 inches of water when a similar edge seal in a small pore plate was prepared without the vibratory assist. The seals 43 or 44 created with the vibratory assist enjoy the same advantages as the seals in the large pore plates prepared without the vibratory assist as compared to prior art approaches.

Figure 6:
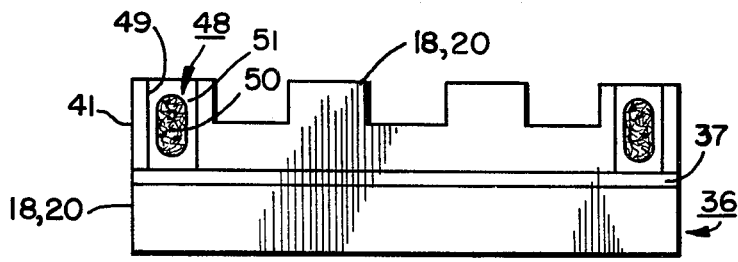
FIG. 6 is a cross-sectional view of a plate used in a bi-polar plate assembly showing yet another edge seal arrangement.
Figure 5:
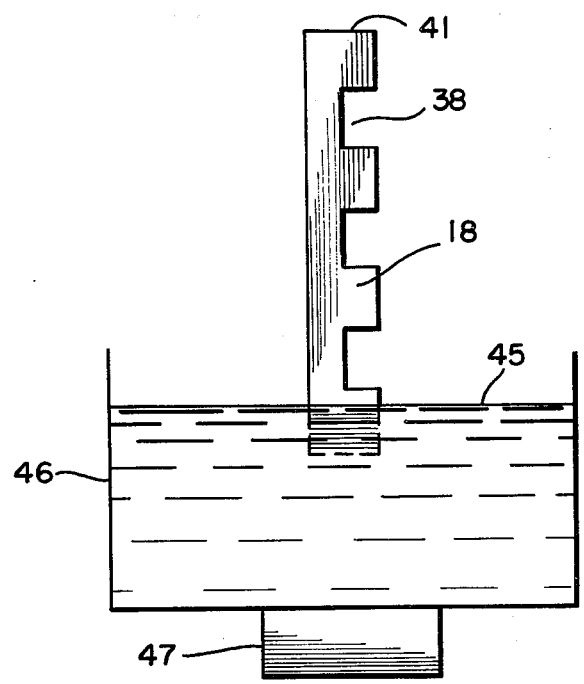
FIG. 5 is a schematic representation of an apparatus for forming an edge seal in a gas distribution plate.

While the seals 43 or 44 prepared in accordance with the previously discussed embodiment are fully effective for their intended purpose, a further alternative seal arrangement is now described. Referring to FIG. 6, a bi-polar plate assembly is illustrated employing a seal 48 in accordance with this embodiment. The bi-polar plate assembly 36 comprises gas distribution plates 18 and 20 in back-to-back relationship with an impervious layer 37 therebetween. A seal 48 is arranged along each edge 41 of the plate 18 and the plate 20. The seal is immediately adjacent the edge 41. A groove 49 is formed adjacent each edge 41 extending parallel thereto and throughout the thickness of the respective plate 18 or 20 up to the impervious layer 37.

After the groove 49 is formed, a paste comprising an immobilized acid is used to fill the grooves 49. Then, a member 50 of a resinous material such as Teflon (polytetrafluoroethylene) is inserted into the paste-filled groove. The immobilized acid preferably comprises an approximately 105% phosphoric acid mixed with Teflon binder and a small particle silicon carbide filler.

The seal 49 is useful with gas distribution plates formed as bi-polar assemblies 36, as shown, or in current collecting assemblies or cooling plate assemblies. It is particularly useful in sealing regions of the plates, such as the edges of plates used in bi-polar assemblies, in order to prevent reactant gas from mixing. Any suitable substance can be used for the seal. One such substance is a composite of a solid fluorocarbon polymer combined with a wet-seal paste, containing electrolyte, which is placed in grooves along two edges of each reactant distribution plate. An effective seal is obtained with these materials due to the contribution of each of the composite components. The structural integrity of the seal is contributed by the continuous fluorocarbon cord while the wet-seal paste improves the contact between the cord and uneven surfaces of crevices.

In a prior art sealing technique, gas distribution plates were edge-sealed with a paste containing silicon carbide, polytetrafluoroethylene (PTFE) and polyethylene oxide (Polyox). The liquid in the grooves was oven-dried for 10–15 minutes to drive off the solvents. Usually, this process is repeated a few times to account for shrinkage. At the end of this cycle, the edge-sealant was sintered at 290° C. for 5 minutes. Sintering helped polymerize the PTFE which bonds the silicon carbide together. There were several aspects of this process that needed improvement. These include (1) the technique is time consuming because of the repetitive nature of the process to fill all the visible voids, (2) the technique creates the possibility of voids occurring due to shrinkage and (3) the technique produces questionable long term stability because under long term operating conditions at high temperatures some voids may reappear. The present invention is an improved edge-sealing method which addresses and rectifies all three of the problems. The problem of voids occurring due to shrinkage during the sealing process and under long-term usage is avoided by using a thick pre-sintered wet-seal paste containing super-saturated phosphoric acid. The edge seal is reinforced with a soft, acid-resistant, continuous cord made of a fluorocarbon polymer.

Figure 7:
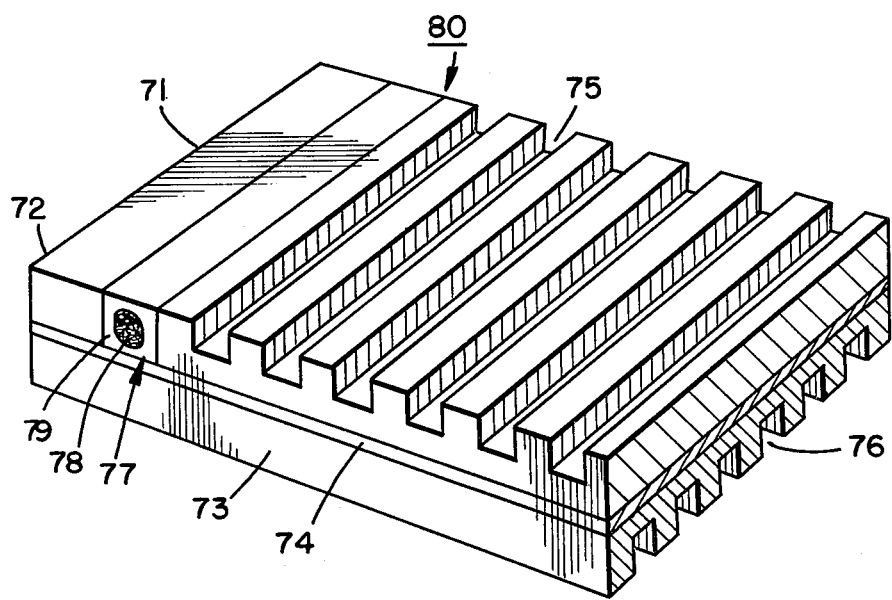
FIG. 7 is an isometric view of another embodiment of an edge seal used in bi-polar current-collecting and cooling plate assembly gas distribution plates.

FIG. 7 shows a bi-polar plate assembly using this technique of sealing. The assembly 71 includes two gas distribution plates, 72 and 73, separated by an impervious plate 74. Grooves 75 carry the reactant gases. The left end groove 80 in plate 72 is the one used for sealing and contains the composite seal 77. Seal 77 includes cord means 78 which reinforces a wet-seal paste 79.

The paste used can be a pre-sintered PTFE/silicon carbide powder to which phosphoric acid is added to make a wet-seal paste of suitable consistency and viscosity. The paste is deposited in the groove such as by filling the groove by hand or applying the paste with a pressure gun or syringe. A suitable material, such as a solid fluorocarbon polymer, in the shape of a continuous cord, is then inserted in the paste in the groove 80.

The composite seal shown in FIG. 7 acts as an effective sealant which is better in utilizing the wet paste and the cord. It is more effective than either the cord or the paste. The wet paste acts as an effective contact between the impervious plate 74 and the cord and the walls of the plates 72 and 73 and the cord. In addition to providing structural stability due to the cord, the wet paste, being pre-sintered, is easy to apply. Further, the composite material effectively seals the crevices and uneven surfaces.

The cord 78 can be any suitable material such as fluorocarbon polymer cord. Preferably, the cord can be of an expanded PTFE-type with a specific gravity of about 0.2 to 0.3 gm/cc. The cord means, preferably, should be able to withstand low pH and typically high temperatures (such as in the 400° F. range) as found in fuel cells. The silicon carbide used is preferably in the 1000–1500 mesh size. The liquid mix containing the silicon carbide powder, PTFE and polyox is pre-sintered prior to adding phosphoric acid, once the plate is sealed, it can be placed in an oven at about 200° C. to drive off excess water.

The following is an example of the method of manufacturing the composite seal. A paste including silicon carbide powder polyethylene oxide (Polyox), polytetrafluoroethylene (PTFE) and phosphoric acid was mixed. The paste was reinforced with a solid fluorocarbon polymer in the shape of a continuous cord which is stable in phosphoric acid at temperatures of up to 600° F. The silicon carbide powder is 1500 mesh in particle size, the PTFE was a Teflon T-30 and the phosphoric acid was 105% in concentration.

The formulation and techniques of making the paste were as follows. Mix about 96 gm. Polyox, about 152 gm SiC powder (1500 mesh) with about 10 ml of PTFE (T-30). Pass it through about 3 mil rollers. Spread the mix in a thin layer over a flat plate and sinter at about 290° C. for at least 30 minutes or until powdery, usually about 45 minutes. Add 105% phosphoric acid in the ratio of about 100 gm powder to about 105–110 ml of acid and mix thoroughly until a smooth paste of uniform consistency is formed. Apply the paste to the edge-seal groove, which has been wetted with alcohol, manually or by a pressurized syringe. Insert the fluorocarbon cord and place the plate in an oven at about 200° C. to drive off excess water. After the cord member is inserted, the top of the groove can be smoothed to remove excess paste therefrom and make the top of the groove and seal even with the plate. This can be done in any convenient way such as by a scraping knife.

The paste was used to edge-seal needled-felt, 10"×14" carbon bi-polar plates. The plates were then tested for leaks at differential pressures of up to 15 inches of water with good results. Carbon plates were also edge-sealed with the wet-seal paste but without the cord. These plates, when leak-tested at 15 inches of water, differential pressure failed the test criteria.

There are several advantages of the seal 49 in FIG. 6 as compared to the seals 43 or 44 in FIGS. 2 & 3. The composite seal is insensitive to pore size and is very effective in sealing small pore gas distribution plates. It also can be applied to a grooved bi-polar plate assembly without blocking the grooves which carry the reactants. The composite seal also does not have need of a lengthy heat treatment and has good structural stability.

The primary purpose of the cord means is to provide structural stability to the whole seal especially as compared to a groove having just the paste in it. The cord gives body to the seal and is insensitive to operating conditions. The primary purpose of the paste is to fill the crevices between the cord and groove surfaces and especially to fill the unevenness of the surfaces which it contacts.

In regard to all of the seals described herein, the electrolyte material of the fuel cell can become part of a wet seal structure. Thus, electrolyte management systems used with fuel cells such as those using external and internal storage means could provide electrolyte material for a wet seal, and, thus, a very effective seal. However, the seals described herein are completely effective in a dry condition to operate as intended; that is, where there is not electrolyte in the seal. Depending on the construction of the fuel cell stack, the seal may or may not ever be contacted by electrolyte. If electrolyte does contact the seal, it can serve to overcome possible imperfections in the seal.

The patents and publications described herein above are intended to be incorporated by reference herein. This invention may be embodied in other forms or carried out in other ways without departing from the spirit or essential characteristics thereof. The present embodiments are therefore to be considered as in all respects illustrative and not restrictive, the scope of the invention being indicated by the appended claims, and all changes which come within the meaning and range of equivalency are intended to be embraced therein.

What is claimed is:

1. A porous sealed gas distribution plate for a fuel cell comprising:
   (a) an impervious layer covering a face of said plate;
   (b) a seal adjacent at least one of said plate, said seal comprising:
   (c) a groove extending along said edge and through said porous plate to said impervious layer;
   (d) a member of resinous material arranged within said groove; and
   (e) a paste surrounding said member and substantially filling said groove whereby a gas impervious seal is provided which is resistant to deterioration by electrolyte of said cell.

2. A porous gas distribution plate as in claim 1 wherein said seal is provided adjacent opposed edges of said plate.

3. A plate as in claim 2 wherein said edges having said seals are arranged parallel to the direction in which gas flows in said plate.

4. A plate as in claim 3 further including a plurality of grooves arranged parallel to said opposed edges.

5. A bi-polar plate assembly comprising two of said gas distribution plates as in claim 4 arranged back-to-back with said impervious layer therebetween and so that said channels face outwardly, said plates being arranged so that the channels in one of said plates are arranged orthogonally with respect in the channels in the other of said plates.

6. A current collecting plate assembly comprising a current collecting plate and a gas distribution plate as in claim 4 arranged in adjacent relationship with said impervious layer between them and with the channels in said gas distribution plate facing outwardly.

7. A fuel cell stack comprising a plurality of said plates as in claim 4 further including first gas supply means communicating with a first group of said plates having said channels arranged parallel to one another in a desired direction, second gas supply means communicating with a second group of said plates having said channels arranged parallel to one another and in a direction generally orthogonal to said desired direction, said first group of plates being arranged alternately in a stack with said second group of plates, and active fuel cell means being arranged intermediate each of said alternating first and second groups of plates.

8. A plate as in claim 1 wherein said resinous member comprises polytetrafluoroethylene and wherein said paste comprises a silicon carbide filler in the form of small particles, a sintered polytetrafluoroethylene binder in the form of fibers, and concentrated phosphoric acid.

9. A process for producing an edge-sealed gas distribution plate for fuel cell comprising:
(a) providing said gas distribution plate;
(b) providing an impervious layer covering a face of said plate;
(c) forming a groove extending along an edge of said plate completely through said porous plate to said impervious layer;
(d) filling said groove with paste and
(e) inserting a member of resinous material into said groove; whereby a gas impervious seal is formed which is resistant to deterioration by electrolyte of said cell.

10. A process as in claim 9 wherein said resinous member comprises a polytetrafluoroethylene cord and wherein said paste comprises a silicon carbide filler in the form of small particles, a polytetrafluoroethylene binder in the form of fibers and concentrated phosphoric acid.

11. A process as in claim 10 further including smoothing the paste at the top of the groove after said member is inserted and removing excess paste therefrom to make the top of the groove even with the plate surface.

12. A process as in claim 10 wherein filling said groove with paste is carried out with a pressurized gun.

13. A process as in claim 10 wherein the groove is filled with pre-sintered paste.

* * * * *

UNITED STATES PATENT AND TRADEMARK OFFICE
CERTIFICATE OF CORRECTION

PATENT NO. : 4,450,212

DATED : May 22, 1984

INVENTOR(S) : H. Feigenbaum, S. Pudick, R. Singh

It is certified that error appears in the above—identified patent and that said Letters Patent is hereby corrected as shown below:

In Column 1, line 8, after "DEN3-241" please add --awarded by the U.S. Department of Energy.--

Signed and Sealed this

Sixth Day of December, 1988

Attest:

DONALD J. QUIGG

Attesting Officer

Commissioner of Patents and Trademarks